United States Patent

Sawai

[11] Patent Number: 6,089,720
[45] Date of Patent: Jul. 18, 2000

[54] ILLUMINATING OPTICAL APPARATUS

[75] Inventor: Yasumasa Sawai, Sakai, Japan

[73] Assignee: Minolta Co., Ltd., Osaka, Japan

[21] Appl. No.: 09/141,093

[22] Filed: Aug. 27, 1998

[30] Foreign Application Priority Data

Aug. 27, 1997 [JP] Japan .................................. 9-230825

[51] Int. Cl.⁷ .................................................. G03B 21/28
[52] U.S. Cl. ............................. 353/98; 353/99; 362/297; 362/346
[58] Field of Search .................... 353/99, 98, 38, 353/31, 34, 37, 102; 362/297, 298, 300, 346, 241, 247; 349/61, 67

[56] References Cited

U.S. PATENT DOCUMENTS

| | | | |
|---|---|---|---|
| 4,497,015 | 1/1985 | Konno et al. | 353/98 |
| 4,642,740 | 2/1987 | True | 362/268 |
| 5,123,729 | 6/1992 | Kondo et al. | 353/99 |
| 5,347,433 | 9/1994 | Sedlmayr | 362/268 |
| 5,755,503 | 5/1998 | Chen et al. | 353/99 |
| 5,911,489 | 6/1999 | Watanabe | 353/98 |

FOREIGN PATENT DOCUMENTS 3-167502  7/1991  Japan .
4-7503   1/1992  Japan .
7-181392  7/1995  Japan .

*Primary Examiner*—William Dowling
*Attorney, Agent, or Firm*—Sidley & Austin

[57] ABSTRACT

An illumination mechanism is disclosed which has a high efficiency of illumination and which is compact. The mechanism includes a reflector, a light source, a first lens array with plural lens cells arranged in rows in a direction perpendicular to an optical axis thereof in which each lens cell is similar in shape to a liquid crystal panel, and a second lens array similar in construction to the first lens array, the lens arrays being disposed along the optical axis. The reflector is divided radially about the optical axis, and has a plurality of partial reflecting surfaces. Each partial reflecting surface is part of a rotation paraboloid with its center being on the optical axis. The light source is placed at a focal position of each partial reflecting surface. The focal length of each partial reflecting surface is generally inversely proportional to a distance from an aperture center of the lens cell of the second lens array to an aperture edge thereof in which the distance is parallel to the direction in which the optical axis and each partial reflecting surface are connected together perpendicularly to the optical axis.

11 Claims, 10 Drawing Sheets

ILLUMINATING OPTICAL APPARATUS

This application is based on application No. 09-230825 filed in Japan, the contents of which are hereby incorporated by reference.

BACKGROUND OF THE INVENTION

1. Field of the Invention

The present invention relates to an illuminating optical apparatus and a projecting optical apparatus in which the illuminating optical apparatus is employed.

2. Description of the Related Art

As an illuminating optical apparatus used for a liquid crystal projector 8, there has been conventionally provided, for example, what is shown in FIG. 1a, in which there is installed an optical integrator that is constituted by a first lens array 20 and a second lens array 22. In this illuminating optical apparatus, a light beam emitted from a light source 12 such as a metal halide lamp, is reflected by a reflector 13 so that the light beam is directed toward a liquid crystal panel 46. The first lens array 20 has a plurality of lens cells 20a each of which has an aperture generally similar in shape to the liquid crystal panel 46, as shown in FIG. 2. The first lens array 20 divides the light beam reflected by the reflector 13 into the number of light beams corresponding to the number of the lens cells 20a. On the other hand, the second lens array 22 has a plurality of lens cells 22a the number of which is the same as the number of the lens cells 20a of the first lens array 20, as shown in FIG. 3. Each of the light beams divided by the lens cells 20a of the first lens array 20 is respectively converged by each of the lens cells 22a of the second lens array 22. That is, the light source 12 and the second lens array 22 have a conjugate relation therebetween. The light source 12 has a light emitting portion that is elongate in a direction of its optical axis, so that the corresponding elongate light source images 12s are formed radially in the second lens array 22, as shown in FIG. 3. The lens cells 22a of the second lens array 22 optically project the corresponding apertures of the lens cells 20a of the first lens array 20 onto the liquid crystal panel 46 via a superposition lens 23 that is mounted near the second lens array 22 on a side of the liquid crystal panel 46. The optically projected images of the light source 12 are superposed, or overlapped, one on another, so that the liquid crystal panel 46 is illuminated uniformly.

By the way, although only one liquid crystal panel 46 is shown in FIG. 1, there are mounted three liquid crystal panels 46, actually. Also, there is mounted an unshown color separation system between the superposition lens 23 and the liquid crystal panel 46, so that each of red-, green- and blue-colored components separated by the color separation system correspondingly illuminates each of the three liquid crystal panels 46, respectively.

In case the light source images 12s formed at the lens cells 22a of the second lens array 22 are larger than the lens cells 22a so that the light source images 12s overflow the lens cells 22a (i.e. so that the light source images 12s exist beyond the lens cells 22a), the overflowing portions of the light source images 12s are not projected toward the liquid crystal panel 46. This results in a loss of the amount of light.

The size, or dimension, of the light source image 12s is inversely proportional to the focal length of the reflector 13. Therefore, in order to make efficient use of the light beam coming from the light source 12 without loss of the amount of light, it is preferable to set the focal length of the reflector 13 so that the light source image 12s is within the region of the lens cell 22a with respect to a direction of a shorter side of the lens cell 22a of the second lens array 22. Conventionally, the focal length of the reflector 13 has been set equally over the entire length of the reflector 13, in this way.

According to the setting of the focal length of the reflector 13, however, the focal length, particularly in a direction of the longer side of the lens cell 22a, becomes too long; therefore, the light source image 12s becomes smaller than necessary relative to the lens cell 22a. On this account, the illumination becomes nonuniform in the direction of the longer side of the lens cell 22a, resulting in deterioration of efficiency for illumination.

Also, the reflector 13 increases in size in proportion to its focal length. Therefore, the reflector 13 becomes larger than necessary relative to the direction of the longer side of the lens cell 22a of the second lens array, resulting in inefficient use of space therein.

SUMMARY OF THE INVENTION

Therefore, it is an object of the present invention to provide an illuminating optical apparatus and a projecting optical apparatus in which the illuminating optical apparatus is employed, that are compact and have a high efficiency of illumination.

In accomplishing this and other objects of the present invention, according to one aspect thereof, there is provided an illuminating optical apparatus comprising: a light source that emits a light; an optical integrator that has a first array with a plurality of optical cells and has a second array with a plurality of optical cells; and a reflector that reflects the light emitted from the light source towards the optical integrator, wherein the reflector has at least one partial reflection surface, in which the partial reflection surface is one of a part of a revolution paraboloid and a part of a spheroid, in which the light source is provided at a focal point of the reflector, and in which a focal length of the partial reflection surface is generally inversely proportional to a distance between a center of an opening of the optical cell of the second array and an edge of the opening thereof.

In the construction, the array can be a lens array, a reflection type of mirror array, or the like; and the optical cell can be a lens cell.

According to the construction, the light that is emitted from the light source is reflected by the partial reflection surfaces of the reflector into forming a light beam generally parallel to the optical axis of the reflector. Then, the light beam passes through the plurality of optical cells of the first array, and then the light beam converges at the central parts of the corresponding optical cells of the second array. Namely, a center of the image of the light source is coincident with a center of each of the optical cells thereof. The size or dimension of the image of the light source is inversely proportional to the focal length of the reflector. Accordingly, the size or dimension of the light source image in any voluntary direction perpendicular to the optical axis thereof from the center of the light source image is inversely proportional to the focal length of the partial reflection surface in the case of connecting the optical axis and the partial reflection surface of the reflector in a direction parallel to the voluntary direction. The focal length of the partial reflection surface is generally inversely proportional to the distance from the center of the opening of the optical cell of the second array to the edge of the opening of the optical cell thereof, in a direction in which the size or dimension of the light source image is sought. Accordingly, the size or dimension of the light source image is generally proportional to the distance from the center of the opening of the optical cell of the second array to the edge of the opening of the optical cell thereof, in a direction in which the size or dimension of the light source image is sought. Consequently, with the construction, it is possible to put or accommodate the light source image generally fully inside of the optical cell of the second array in any direction perpendicular to the optical direction thereof. Also, with the construction, it is possible to design the reflector with a necessary size or dimension over its periphery.

Therefore, with the construction, there is provided a compact illuminating optical apparatus with a high efficiency of illumination.

In the construction, the light source and the second array can be in conjugation with each other relative to the first array, and wherein the first array and an illuminated surface can be in conjugation with each other relative to the second array.

In the construction, there can be further provided a device for separating a P-polarized light component and an S-polarized light component from each other, wherein the device can be provided between the first array and the second array.

Preferably, a shape of an opening of an optical cell of the first array is similar to a shape of an illuminated surface, and a shape of the opening of the optical cell of the second array is similar to the shape of the illuminated surface.

Preferably, there are provided a pair of light sources and a pair of reflectors, wherein the light that is emitted from each of the light sources and is reflected by each of the reflectors, is incident upon the optical integrator.

According to the construction, the number of light beams that are emitted from each of the light sources and are taken in by each of the reflectors becomes greater. Therefore, with the construction, the illuminated surface is illuminated with a higher efficiency.

In order to accomplish the above object, according to another aspect of the present invention, there is provided a projecting optical apparatus comprising: an image forming device for forming an image; a light source that emits a light; an optical integrator that has a first array with a plurality of optical cells and has a second array with a plurality of optical cells; a reflector that reflects the light emitted from the light source towards the optical integrator, in which the optical integrator illuminates the image forming device, in which the reflector has at least one partial reflection surface, in which the partial reflection surface is one of a part of a revolution paraboloid and a part of a spheroid, in which the light source is provided at a focal point of the reflector, and in which a focal length of the partial reflection surface is generally inversely proportional to a distance between a center of an opening of the optical cell of the second array and an edge of the opening thereof; and a projecting optical mechanism for projecting the image which is formed by the image forming device, by directing the light guided through the optical integrator towards the image forming device.

In the construction, the light source and the second array can be in conjugation with each other relative to the first array, and wherein the first array and an illuminated surface of the image forming device can be in conjugation with each other relative to the second array.

In the construction, there can be further provided a device for separating a P-polarized light component and an S-polarized light component from each other, wherein the device is provided between the first array and the second array.

In the construction, preferably, a shape of an opening of an optical cell of the first array is similar to a shape of an illuminated surface of the image forming device, and a shape of the opening of the optical cell of the second array is similar to the shape of the illuminated surface thereof.

Preferably, there are provided a pair of light sources and a pair of reflectors, wherein the light that is emitted from each of the light sources and is reflected by each of the reflectors, is incident upon the optical integrator.

According to the construction, the number of light beams that are emitted from each of the light sources and are taken in by each of the reflectors becomes greater. Therefore, with the construction, the illuminated surface is illuminated with a higher efficiency.

In still another aspect of the present invention, there is provided a light source apparatus that is applicable to an illuminating optical apparatus in which there is provided an optical integrator that has a first array with a plurality of optical cells and has a second array with a plurality of optical cells, the light source apparatus comprising: a light source that emits a light; and a reflector that has at least one partial reflection surface, wherein the partial reflection surface is one of a part of a revolution paraboloid and a part of a spheroid, wherein the light source is provided at a focal point of the reflector, and wherein a focal length of the partial reflection surface is generally inversely proportional to a distance between a center of an opening of the optical cell of the second array and an edge of the opening thereof.

BRIEF DESCRIPTION OF THE DRAWINGS

This and other objects and features of the present invention will become clear from the following description taken in conjunction with preferred embodiments thereof with reference to the accompanying drawings, in which:

FIG. 3 is a view showing a second lens array with a plurality of lens cells which are employed in the prior art liquid crystal projector as shown in FIG. 1a;

DETAILED DESCRIPTION OF THE PREFERRED EMBODIMENTS

Figure 1A:
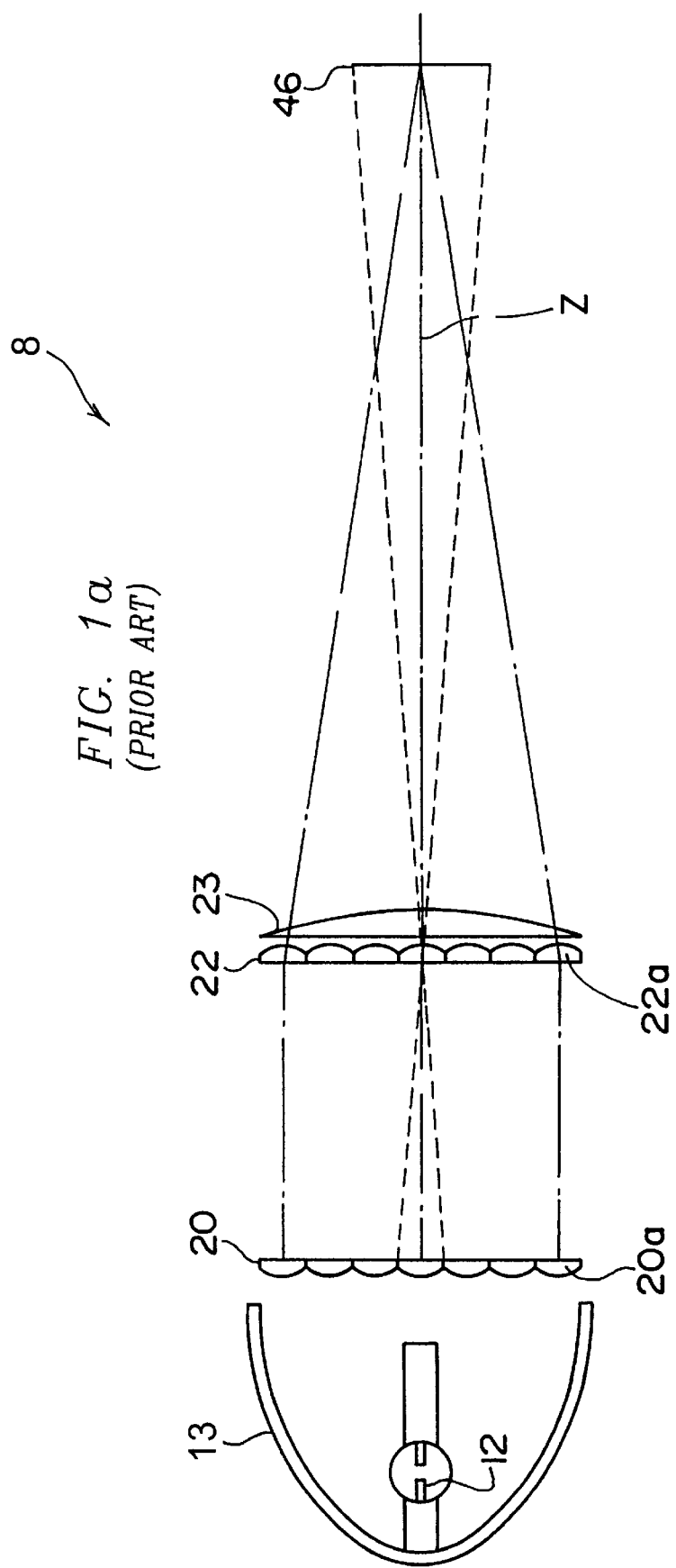
FIG. 1a is an arrangement view of a liquid crystal projector, as a projecting optical apparatus, according to a prior art.

Before the description of the embodiments of the present invention proceeds, it is to be noted that like or corresponding parts are designated by like reference numerals throughout the accompanying drawings.

With reference to FIGS. 1 through 23, a description is made below on a liquid crystal projector, as a projecting optical apparatus, according to each of three embodiments of the present invention.

First, with reference to FIGS. 1b to 3, 5 to 14, 16 and 19, the description is made on the liquid crystal projector 10 according to a first embodiment of the present invention.

Figure 1B:
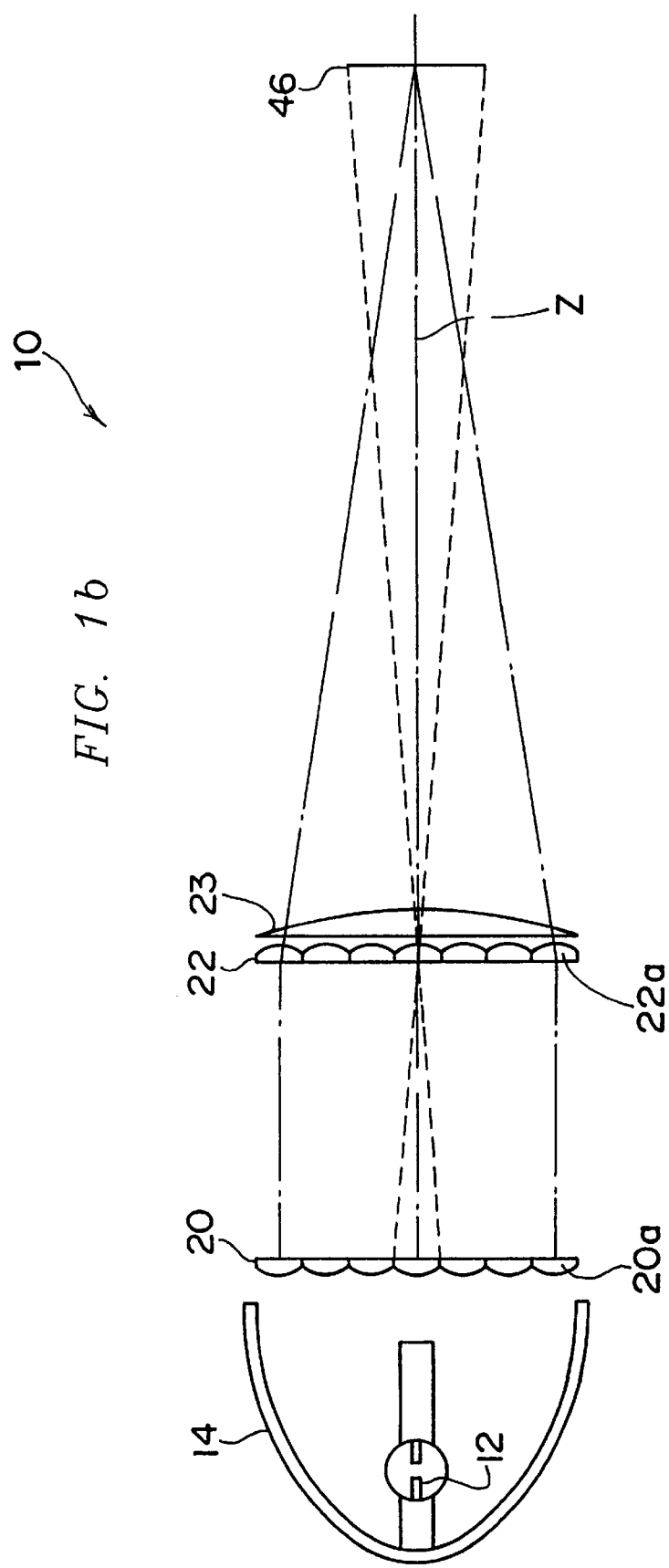
FIG. 1b is an arrangement view of a liquid crystal projector, as a projecting optical apparatus, according to a first embodiment of the present invention.

The liquid crystal projector 10 of the first embodiment has an optical system, as shown in FIG. 1b, which is similar to the optical system employed in the conventional liquid crystal projector already described above. Therefore, the liquid crystal projector 10 of the first embodiment will be explained below, especially focussing on points in contrast with the conventional liquid crystal projector 8 mentioned above.

Different from the conventional liquid crystal projector, the projector of the first embodiment has a reflector 14 the reflecting surface of which is radially divided about an optical axis Z, as shown by a bold line in each of FIGS. 7 to 14. Partial reflecting surfaces thus divided are parts of a paraboloid of revolution, the center of which is on the optical axis Z, or parts of a spheroid of revolution, the two focal points of which are coincident with each other, where a light source 12 is positioned at the focal point of each reflecting surface.

More specifically, as shown in FIGS. 7 through 14, when the reflector is viewed in a direction of the optical axis Z, the configurations of the reflectors 14, 14a, 14', 14a', 15, 15a, 15', 15a' are as shown by the bold lines in those figures, where each of the configurations of the reflectors is radially divided in correspondence to an ideal focal length shown by a thin line in each of those figures.

The thin line in each of the figures, expressing the ideal focal length, represents a focal length of the reflecting surface of the reflector in which the light source image is accommodated fully in the lens cell 22a. That is, the focal length of the reflecting surface of the reflector positioned in the direction of a line segment that couples the optical axis (the center of the graphic) and a point on the thin line is represented by the length of the line segment.

Figure 5:
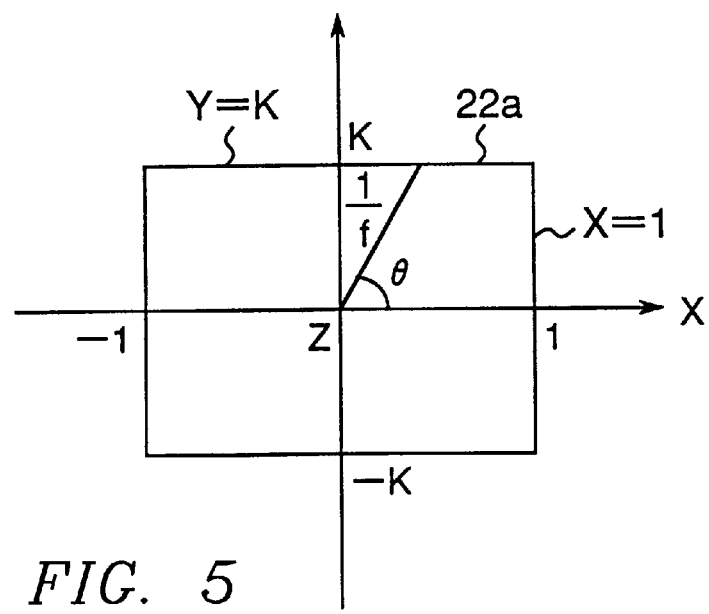
FIG. 5 is an explanatory view showing a relation between a reflector of FIG. 1 and a lens cell of the second lens array of FIG. 3.
Figure 6:
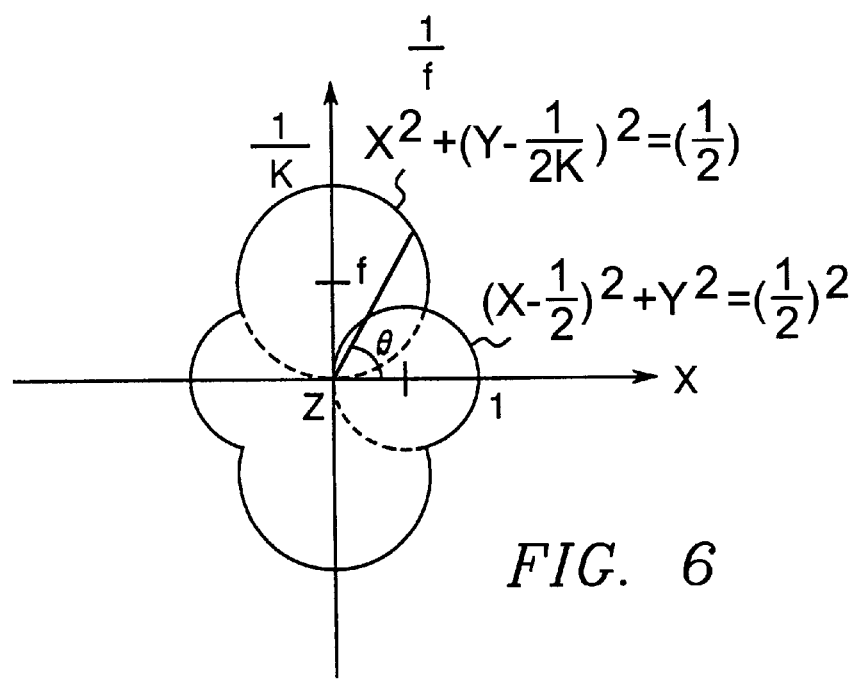
FIG. 6 is an explanatory view showing an ideal focal length of the reflector employed in the liquid crystal projector shown in FIG. 1.

That is, if a lens cell 22a of the second lens array 22 has a rectangular shape in which the aperture in the vertical direction (i.e. in the direction of Y-axis) is K times larger than the same aperture in the horizontal direction (i.e. in the direction of X-axis) where the horizontal direction is taken as a reference direction as shown in FIG. 5, the ideal focal length is as shown by a solid line in FIG. 6.

In more detail, the reflector 14, as a part of the optical system, is equivalent to a convex lens having a focal length equal to the focal length of the reflector 14. Therefore, the size or dimension of a light source image formed at the position of the second lens array 22 is inversely proportional to the focal length of the reflector 14. Accordingly, in case that the focal length of the reflecting surface of the reflector 14 is "f" where the reflecting surface is in any arbitrary direction from the light source 12, and in case that the distance from its aperture center to its aperture edge of the lens cell 22a of the second lens array 22 in a direction in which the light beam reflected by the reflecting surface of the reflector 14 forms an image is A/f (where "A" is a predetermined proportional constant), an appropriate selection of the proportional constant "A" allows the light source image to be formed or accommodated fully within the lens cell 22a.

In FIGS. 5 and 6, the proportional constant "A" is given by 1 for simplicity. It is assumed that the ideal focal length of the reflecting surface of the reflector 14 at an angle "θ" relative to the X axis is "f" as shown in FIG. 6, and that the distance from the aperture center to the aperture edge of the rectangular lens cell 22a is 1/f as shown in FIG. 5.

For example, referring to FIG. 5, if Y=K, then $$(1/f)\sin\theta = K \tag{1}.$$

On the other hand, referring to FIG. 6, because there are relations:

$$f = (X^2 + Y^2)^{1/2} \tag{2}$$

and $$\sin\theta = Y/(X^2 + Y^2)^{1/2} \tag{3},$$

substituting Equations (2) and (3) into Equation (1) and putting them in order yields:

$$X^2 + (Y - \tfrac{1}{2}K)^2 = (\tfrac{1}{2}K)^2 \qquad (4)$$

as shown in FIG. 6.

Similarly, in correspondence to X=1 shown in FIG. 5, $$(X - \tfrac{1}{2})^2 + Y^2 = (\tfrac{1}{2})^2 \qquad (5)$$

results, as shown in FIG. 6.

Therefore, the ideal focal length of the reflector 14 corresponding to the rectangular lens cell 22a shown in FIG. 5 is as shown by the solid line in FIG. 6.

Meanwhile, the reflecting surface of the reflector 14 increases in size in proportion to its focal length, by which the size, or the dimension, of the reflector 14 in a direction perpendicular to the optical axis thereof is determined. If the focal length of the reflecting surface of the reflector 14 is smaller than the ideal focal length, then the light source image becomes so large as to be out of the lens cell 22a, resulting in a loss of illumination, or in a loss of the amount of light. On the other hand, if the focal length of the reflecting surface of the reflector 14 is larger than the ideal focal length, then the light source image becomes small, only resulting in a rather smaller image formed at the lens cell 22a without causing any loss of the amount of light.

Therefore, in case that the reflector 14 is radially divided about the optical axis Z of the reflector 14 so that each divided reflecting surface of the reflector 14 has a focal length equal to or slightly larger than the ideal focal length, the light source image can be formed as large as possible in any direction without overflowing the lens cell 22a. The reflecting surface of the reflector 14 is divided in this way.

In case that the liquid crystal panel 46 has an aspect ratio of 3:4, the aperture of the lens cell 22a of the second lens array 22 has approximately a ratio of about 3:4, too. In this construction, an ideal focal length of the reflector 14 that allows the light source image 12s to be accommodated efficiently within the lens cell 22a of the second lens array 22 is as shown by a thin line in FIG. 7. The configuration in which the circumference of the reflector 14 is divided into four in correspondence with the ideal focal length is shown by a bold line in the same figure.

Figure 7:
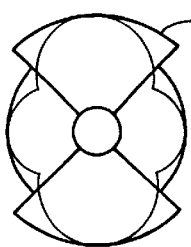
FIG. 7 is a view showing a reflector used in the liquid crystal projector, as viewed in a direction of the optical axis of the reflector.
Figure 11:
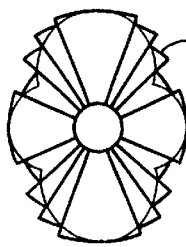
FIG. 11 is a view showing a reflector used in the liquid crystal projector, as viewed in a direction of the optical axis of the reflector.
Figure 16:
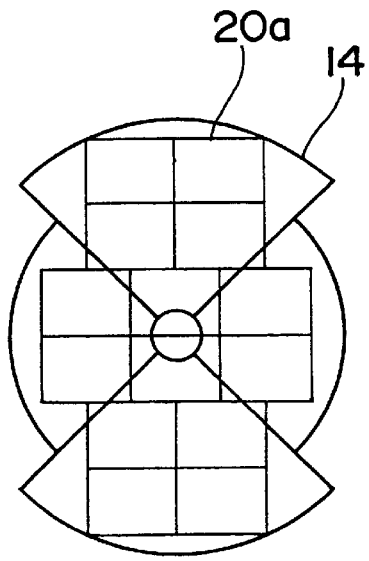
FIG. 16 is a view showing a relation between the reflector and lens cells employed in the liquid crystal projector of FIG. 1.

FIG. 16 shows an example of array of the lens cells 20a with the aperture of the first lens array 20 being divided in correspondence to the reflector 14 shown in FIG. 7. With the arrangement of the lens cells 20a, it is possible to reduce occurrence of any uneven coloring in the color separation system. In this construction, partial reflecting surfaces of the reflector 14 have the same focal point 14s as shown in the cross-sectional view of FIG. 19, where an outgoing end face or a projecting end face 14t is aligned on the same plane.

Each partial reflecting surface of the reflector 14 may be either a part of the paraboloid or a part of the ellipsoid. In case that it is the part of the ellipsoid, two focal points of the ellipsoid must be coincident with each other.

Next, a description is made below on the liquid crystal projector 10a according to a second embodiment of the present invention, with reference to FIGS. 4, 7 to 15, 17, 18 and 20.

Figure 15:
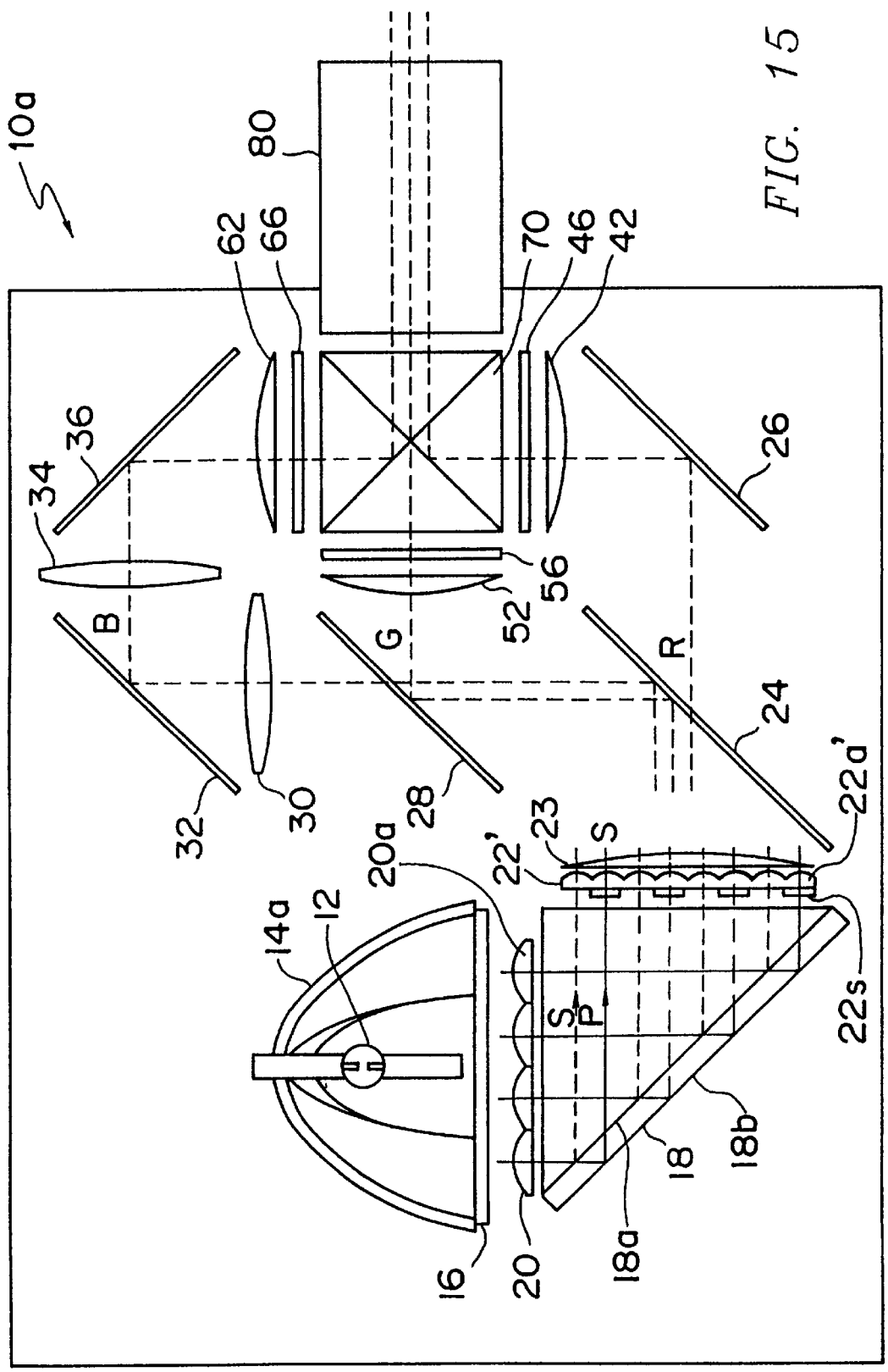
FIG. 15 is an arrangement view of the liquid crystal projector according to the second embodiment of the present invention.

The liquid crystal projector 10a, as shown in FIG. 15, has a high efficient illuminating optical apparatus for polarizing and transforming an illumination light by combining an optical integrator and a polarizing beam splitter to each other.

More specifically, a light emitted from a metal halide lamp 12 is reflected by a reflector 14a, and then an ultraviolet ray and a near infrared ray which are unnecessary and harmful as an illuminating light are cut by a UV-IR cut filter 16. Thus, the light beam without the ultraviolet ray and the near infrared ray is incident on the first lens array 20. The light beam that passes through the first lens array 20, while it is being converged, becomes incident on a polarizing-and-separating prism 18.

The polarizing-and-separating prism 18 is a prism in which a parallel flat plate is connected to a surface of a rectangular prism where the surface is opposed to a right angle of the rectangular prism, and in which a polarizing-and-separating film is formed at the connecting surface 18a therebetween. The light beam incident on the polarizing-and-separating prism 18 are separated into "S" polarized light and "P" polarized light, both of which then project from the polarizing-and-separating prism 18.

More specifically, the "S" polarized light is reflected by the polarizing-and-separating film of the bonding surface 18a so as to be projected from the polarizing-and-separating prism 18, and then the light focuses near a second lens array 22'.

On the other hand, the "P" polarized light passes through the polarizing-and-separating film of the bonding surface 18a, then it is totally reflected by a rear surface 18b of the parallel plate, and again it passes through the polarizing-and-separating film of the bonding surface 18a, then it is projected from the polarizing-and-separating prism 18, and then it focuses near the second lens array 22'.

The parallel plate shifts both of the "P" polarized light and the "S" polarized light by ½ of the lateral width of the lens cell 20a of the first lens array 20.

Meanwhile, the second lens array 22' is a generally plate-shaped lens in which a plurality of lens cells 22a' are arrayed in a direction generally parallel to a plane which is perpendicular to the optical axes thereof. The lateral size of each lens cell 22a' of the second lens array 22' is ½ of that of each lens cell 20a of the first lens array 20, and the lens cells 22a' are arranged in the lateral direction with the number thereof double the number of the lens cells 20a in the first lens array 20. Each lens cell 22a' has such a power as to focus an image of its corresponding lens cell 20a of the first lens array 20 onto the liquid crystal panel 46, 56, 66.

To the second lens array 22', are connected ½ wave plates 22s every second lens cell 22a' so that the "P" polarized light emitted from the polarizing-and-separating prism 18 is transformed into the "S" polarized light. In this way, all the light, which is transformed into the "S" polarized light, passes through the second lens array 22', and enters a superposition lens 23.

The light beam that has left the superposition lens 23 is separated into three components: a red component designated by "R", a green component designated by "G", and a blue component designated by "B", which illuminate the liquid crystal panels 46, 56, 66, respectively.

More specifically, the light beam that has been projected from the superposition lens 23 is separated into the red component "R" which passes through a red-pervious dichroic mirror 24, is reflected by a reflecting mirror 26 and reaches the red liquid crystal panel 46, is separated into the green component "G" which is reflected by the red-pervious dichroic mirror 24, is reflected by a blue-pervious dichroic mirror 28 and reaches the green liquid crystal panel 56, and is separated into the blue component "B" which is reflected by the red-pervious dichroic mirror 24, passes through the blue-pervious dichroic mirror 28, is reflected by a pair of reflecting mirrors 32, 36, and reaches the blue liquid crystal panel 66.

On a side of the light source 12 relative to the liquid crystal panels 46, 56, 66, there are mounted three field lenses 42, 52 and 62, respectively. The red and green field lenses 42, 52 form secondary light source images being formed near the second lens array 22', near a pupil of a projection lens 80. The blue component "B" that has passed through the blue-pervious dichroic mirror 28 enters a condenser lens 30, focuses near a relay lens 34, and forms an image near the blue liquid crystal panel 66. The blue field lens 62 forms a secondary light source image near the relay lens 34, near the pupil of the projection lens 80. The individual light components "R", "G" and "B" that have been modulated by the red, green and blue liquid crystal panels 46, 56 and 66, are synthesized (i.e. combined together) by a cross-dichroic prism 70, and the synthesized light (i.e. combined light) is projected towards an unshown screen through the projection lens 80.

This liquid crystal projector 10a according to the second embodiment is made by integrating the polarization-and-transformation optical system and the optical integrator, in which an illumination with a high uniformity and high efficiency thereof is realized.

Also, with the construction thereof, the durability of the second lens array 22' and the ½ wave plates 22s is improved, and the density of the secondary light source image can be reduced without lowering the efficiency of illumination.

Figure 4:
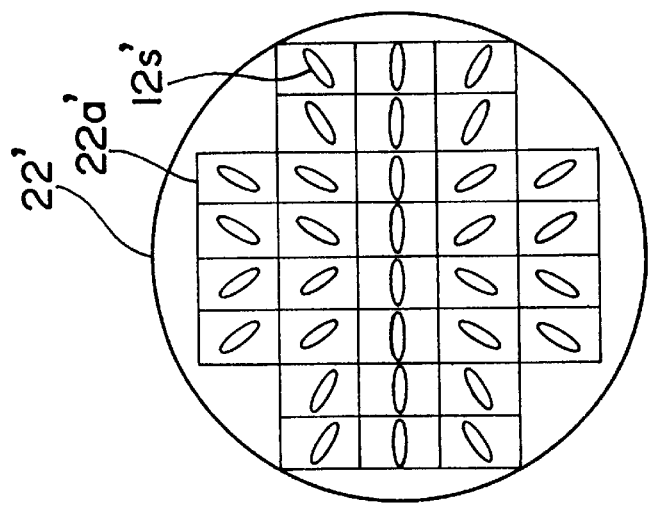
FIG. 4 is a view showing a lens array with a plurality of lens cells which are employed in the liquid crystal projector according to a second embodiment of the present invention.
Figure 3:
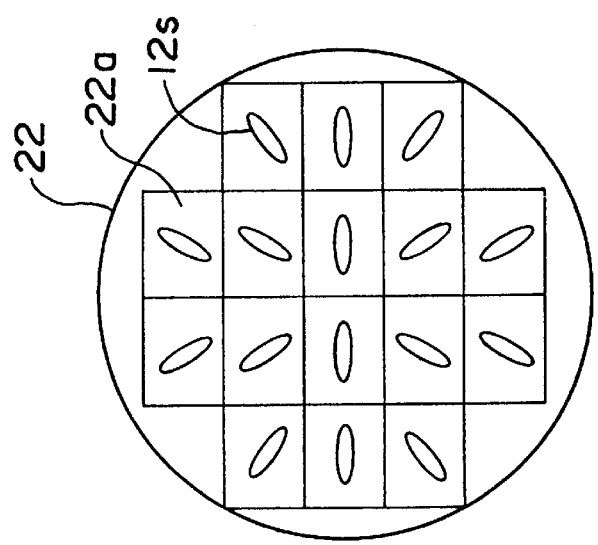
Figure 2:
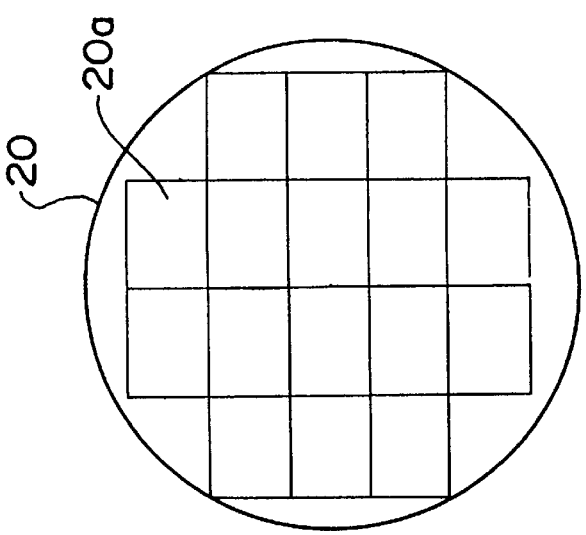
FIG. 2 is a view showing a first lens array with a plurality of lens cells which are employed in the prior art liquid crystal projector as shown in FIG. 1.

The apertures of the lens cells 22a' of the second lens array 22' of the liquid crystal projector 10a are divided into two parts for use of "P" polarization and "S" polarization as shown in FIG. 4. Therefore, in case that the aspect ratio of the liquid crystal panels 46, 56, 66 is 3:4, the aspect ratio of each lens cell 22a' of the second lens array 22' is about 3:2.

Figure 8:
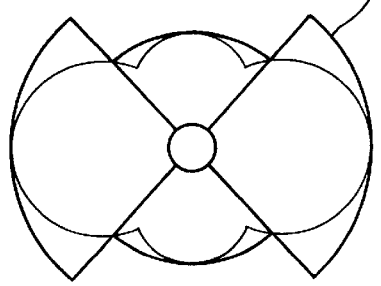
FIG. 8 is a view showing a reflector used in the liquid crystal projector, as viewed in a direction of the optical axis of the reflector.
Figure 12:
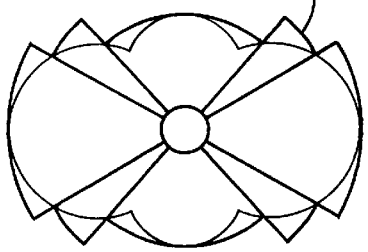
FIG. 12 is a view showing a reflector used in the liquid crystal projector, as viewed in a direction of the optical axis of the reflector.
Figure 17:
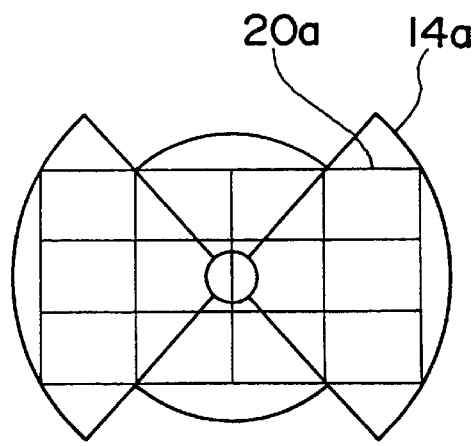
FIG. 17 is a view showing a relation between the reflector and lens cells employed in the liquid crystal projector of FIG. 15.

With this construction, the ideal focal length of the reflector 14a is as shown by a thin line in FIG. 8. The reflector 14a is divided into four parts in its circumferential direction, which are shown by a solid line in the same figure. FIG. 17 illustrates an example of array of the lens cells 20a in which the aperture of the first lens array 20 is divided in correspondence to the reflector 14a of FIGS. 8 and 15.

In the first and second embodiments, it has been explained about an arrangement in which the aspect ratio of the liquid crystal panels 46, 56, 66 is 3:4. As a modification to the embodiments, it is possible to construct the reflector so that the aspect ratio of the liquid crystal panels 46, 56, 66 is 9:16, as shown in FIGS. 9 and 10.

Figure 9:
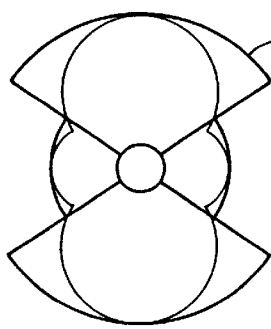
FIG. 9 is a view showing a reflector used in the liquid crystal projector, as viewed in a direction of the optical axis of the reflector.
Figure 13:
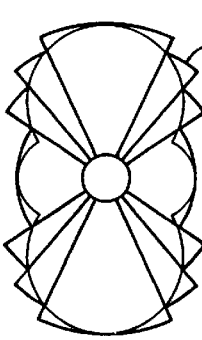
FIG. 13 is a view showing a reflector used in the liquid crystal projector, as viewed in a direction of the optical axis of the reflector.
Figure 10:
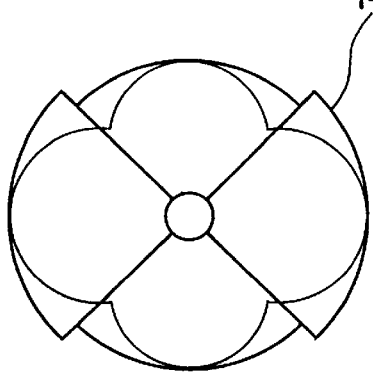
FIG. 10 is a view showing a reflector used in the liquid crystal projector, as viewed in a direction of the optical axis of the reflector.
Figure 14:
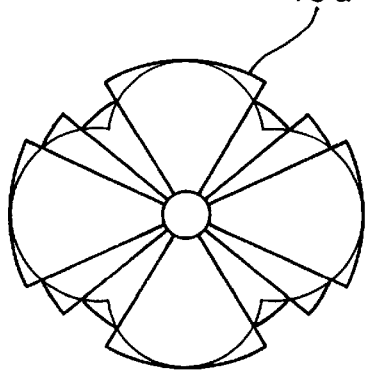
FIG. 14 is a view showing a reflector used in the liquid crystal projector, as viewed in a direction of the optical axis of the reflector.

FIG. 9 shows a reflector 14' in which the light (or the light beam) is not polarized nor transformed as in the first embodiment, and FIG. 10 shows a reflector 14a' in which the light (or the light beam) is polarized and transformed as in the second embodiment.

Also, FIGS. 11 to 14 show reflectors 15, 15a, 15', 15a', according to other modifications of the first and second embodiments, in which the reflector 14, 14a, 14', 14a' of FIGS. 7 to 10 are further multi-divided, respectively.

Figure 18:
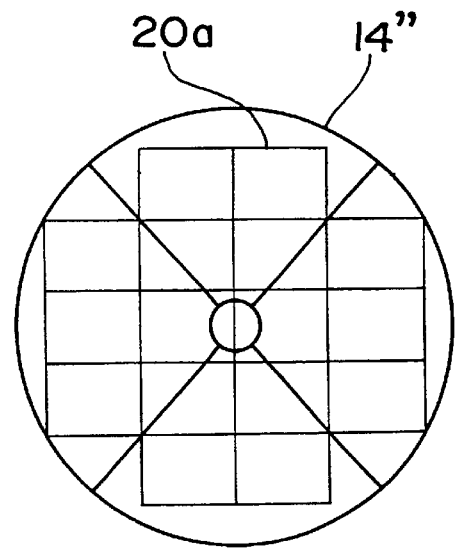
FIG. 18 is a view showing a relation between the reflector and lens cells employed in the liquid crystal projector of FIG. 15.
Figure 19:
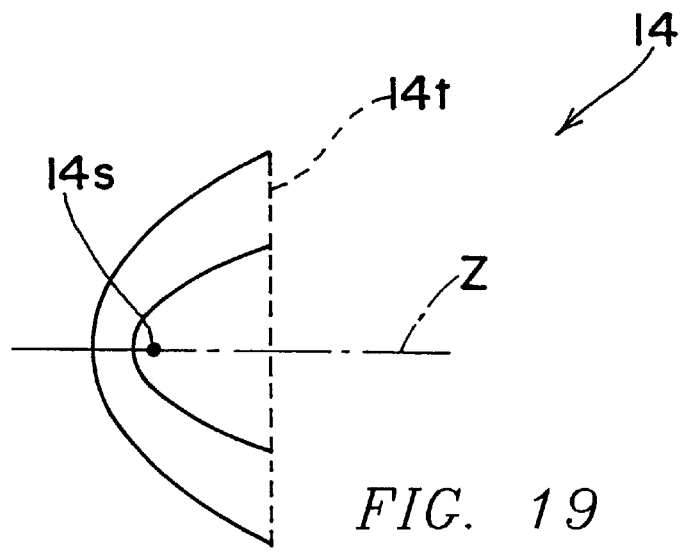
FIG. 19 is a cross-sectional view of a reflecting surface of the reflector, of FIG. 1, shown along the optical axis.

Further, FIG. 18 shows a modification in which a light beam coming from a reflector 14" becomes circular as a whole when viewed in the direction of its optical axis. The curved surface of the reflector 14" with this construction differs in length in the direction of its optical axis Z, as shown in FIG. 20.

Figure 20:
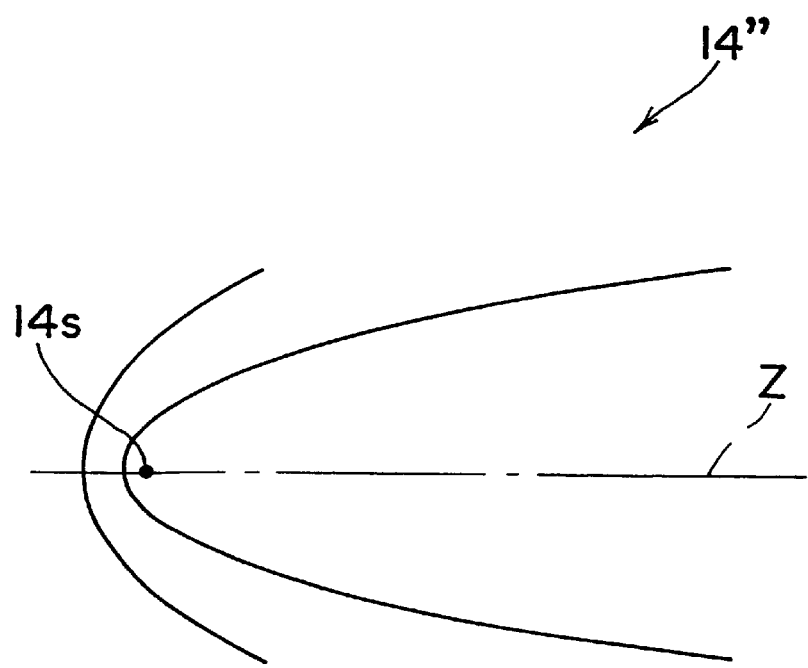
FIG. 20 is a cross-sectional view of a reflecting surface of the reflector, of FIG. 15, shown along the optical axis.

With the construction as shown in FIG. 20, the number of light beams, which come from the light source and are reflected by one of the divided partial reflecting surfaces, increases, so that the liquid crystal panels are illuminated with higher efficiency.

Next, with reference to FIGS. 21 to 23, the description is made below on the liquid crystal projector 10b according to a third embodiment of the present invention.

Figure 21:
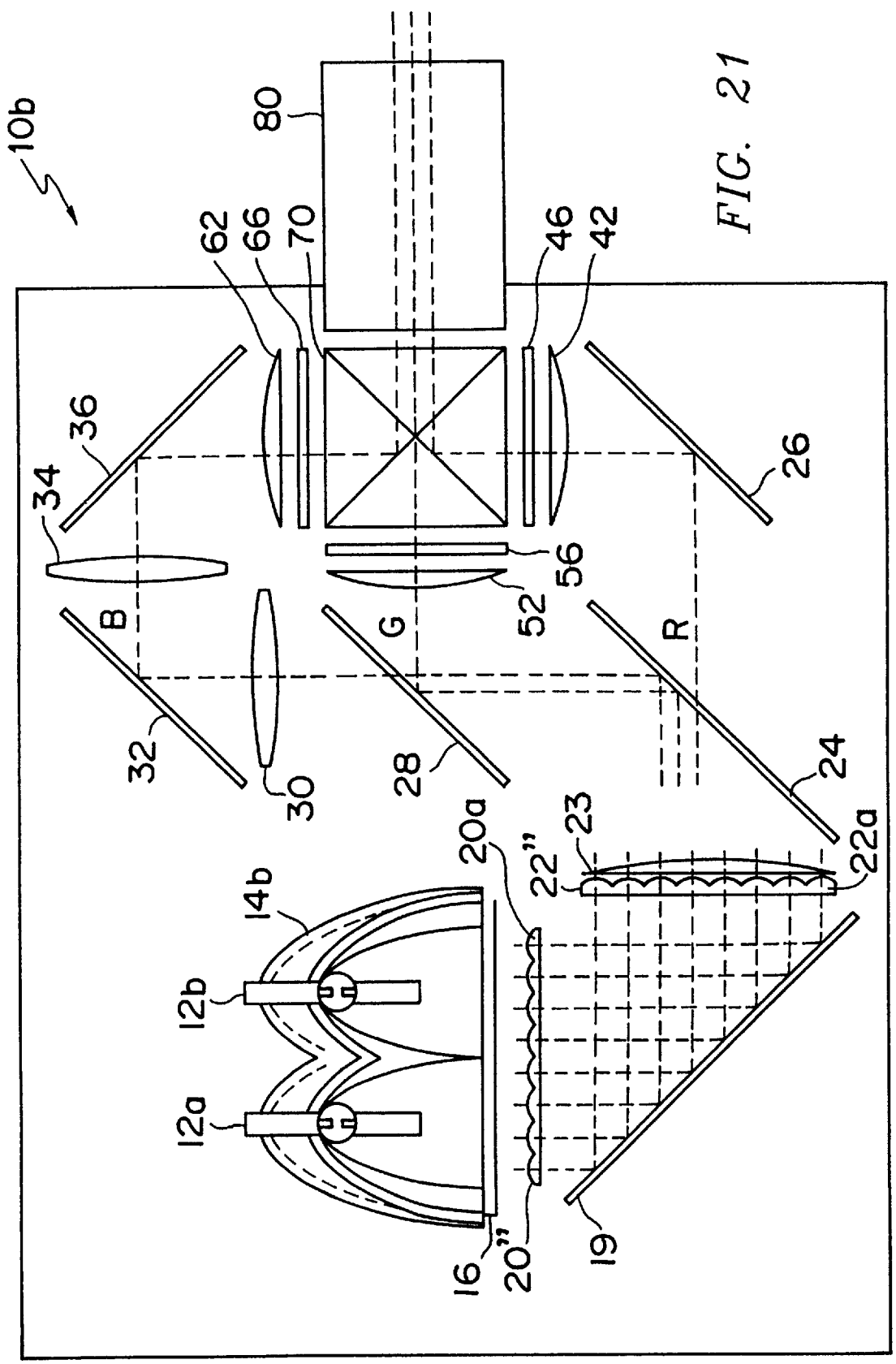
FIG. 21 is an arrangement view of a liquid crystal projector according to a third embodiment of the present invention.

The liquid crystal projector 10b of the third embodiment employs a pair of light source lamps 12a, 12b, as shown in FIG. 21. The liquid crystal projector 10b is generally similar in construction to the liquid crystal projector 10a according to the second embodiment shown in FIG. 15, except that the reflector 14b employs the two light source lamps 12a, 12b and except that there are arranged a plurality of lens cells 20a, 22a of first and second lens arrays 20", 22" in correspondence with the installation of the pair of light source lamps 12a, 12b, as shown in the same figure.

Figure 22:
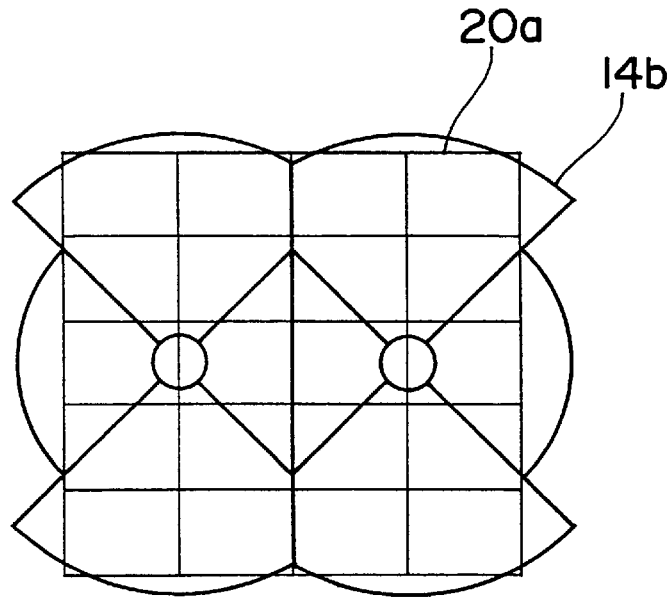
FIG. 22 is a view showing a relation between a reflector and lens cells employed in the liquid crystal projector of FIG. 21.
Figure 23:
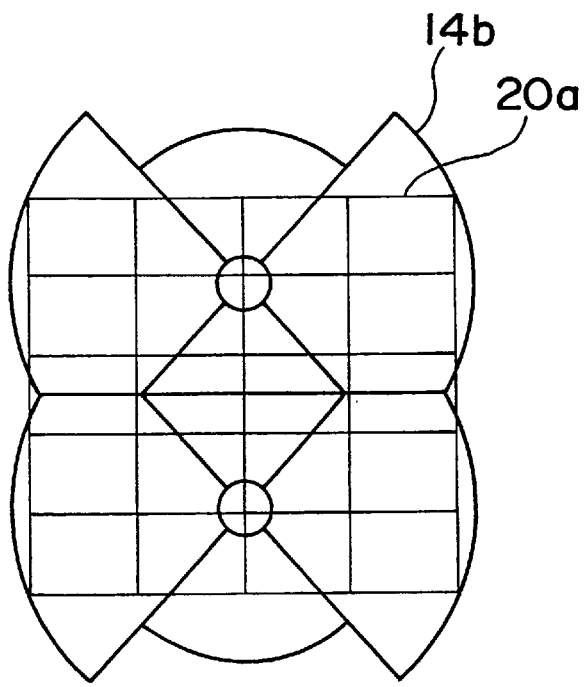
FIG. 23 is a view showing a relation between the reflector and lens cells employed in the liquid crystal projector of FIG. 21.

More specifically, according to the third embodiment, the configuration of the reflector 14b and the array (i.e. arrangement) of the lens cells 20a of the first lens array 20", are as shown in FIGS. 22 and 23. As illustrated in the figures, according to this embodiment, no matter whether the two light source lamps 12a, 12b are arranged longitudinally or laterally, it is possible to realize a compact reflector 14b without lowering the efficiency of space.

In addition, a very bright illumination can be realized by using the pair of light source lamps 12a, 12b, and it is possible to simplify the construction of the liquid crystal projector by employing a reflection mirror 19 in place of the polarizing-and-separating prism 18. In case that all partial reflecting surfaces of the reflector 14b are made of parts of a paraboloid, the light, or light beams, from the two light sources 12a, 12b can be combined suitably.

As described above, the liquid crystal projectors 10, 10a, 10b are equipped with illuminating optical apparatuses which are all compact and efficient. That is, the reflector 14, 14a, 14b is prevented from becoming larger in size than necessary; namely, the apparatus is reduced in both size and thickness. Therefore, this allows reduction in weight, improvement in portability or handiness, and a low manufacturing cost.

Although the present invention has been fully described in connection with the preferred embodiments thereof and some modifications of the preferred embodiments with reference to the accompanying drawings, it is to be noted that various other changes and modifications are apparent to those skilled in the art. Such changes and modifications are to be understood as included within the scope of the present invention as defined by the appended claims unless they depart therefrom.

What is claimed is:

1. An illuminating optical apparatus comprising:

a first light source for emitting light;

an optical integrator including a first array with a plurality of optical cells and a second array with a plurality of optical cells; and a first reflector for reflecting light emitted from the first light source towards the optical integrator, wherein the first reflector includes at least one partial reflection surface, the partial reflection surface having a shape selected from the group consisting of a portion of a revolution paraboloid and a portion of a spheroid, the first light source being provided at a focal point of the first reflector, and wherein, along each radial direction perpendicular to an optical axis of the first reflector, a focal length of the at least one partial reflection surface is inversely proportional to a distance between a center of an opening of an optical cell of the second array and an edge of the opening thereof along a corresponding radial direction.

2. An illuminating optical apparatus as claimed in claim 1, wherein the first light source and the second array are in conjugation with each other relative to the first array, and wherein the first array and an illuminated surface are in conjugation with each other relative to the second array.

3. An illuminating optical apparatus as claimed in claim 1, further comprising a device for separating a P-polarized light component and an S-polarized light component from each other, wherein the device is provided between the first array and the second array.

4. An illuminating optical apparatus as claimed in claim 1, wherein a shape of an opening of an optical cell of the first array is similar to a shape of an illuminated surface, and wherein a shape of the opening of the optical cell of the second array is similar to the shape of the illuminated surface.

5. An illuminating optical apparatus as claimed in claim 1, further comprising:

a second light source for emitting light; and a second reflector for reflecting light emitted from the second light source towards the optical integrator, wherein the second reflector includes at least one partial reflection surface, the partial reflection surface having a shape selected from the group consisting of a portion of a revolution paraboloid and a portion of a spheroid, the second light source being provided at a focal point of the second reflector, wherein, along each radial direction perpendicular to an optical axis of the second reflector, a focal length of the at least one partial reflection surface of the second reflector is inversely proportional to a distance between a center of an opening of an optical cell of the second array and an edge of the opening thereof along a corresponding radial direction, and wherein light that is emitted from each of the first and second light sources and is reflected by the respective reflector, is incident upon the optical integrator.

6. A projecting optical apparatus comprising:

an image forming device for forming an image;

a first light source for emitting light;

an optical integrator including a first array with a plurality of optical cells and a second array with a plurality of optical cells;

a first reflector for reflecting light emitted from the first light source towards the optical integrator, the optical integrator thereby illuminating the image forming device, the first reflector including at least one partial reflection surface, the partial reflection surface having a shape selected from the group consisting of a portion of a revolution paraboloid and a portion of a spheroid, the first light source being provided at a focal point of the first reflector, and along each radial direction perpendicular to an optical axis of the first reflector, a focal length of the at least one partial reflection surface is inversely proportional to a distance between a center of an opening of an optical cell of the second array and an edge of the opening thereof along a corresponding radial direction; and a projecting optical mechanism for projecting the image which is formed by the image forming device thus irradiated by light guided through the optical integrator towards the image forming device.

7. A projecting optical apparatus as claimed in claim 6, wherein the first light source and the second array are in conjugation with each other relative to the first array, and wherein the first array and an illuminated surface of the image forming device are in conjugation with each other relative to the second array.

8. A projecting optical apparatus as claimed in claim 6, further comprising a device for separating a P-polarized light component and an S-polarized light component from each other, wherein the device is provided between the first array and the second array.

9. A projecting optical apparatus as claimed in claim 6, wherein a shape of an opening of an optical cell of the first array is similar to a shape of an illuminated surface of the image forming device, and wherein a shape of the opening of the optical cell of the second array is similar to the shape of the illuminated surface thereof.

10. A projecting optical apparatus as claimed in claim 6, further comprising:

a second light source for emitting light; and a second reflector for reflecting light emitted from the second light source towards the optical integrator, the second reflector including at least one partial reflection surface, the partial reflection surface having a shape selected from the group consisting of a portion of a revolution paraboloid and a portion of a spheroid, the second light source being provided at a focal point of the second reflector, and along each radial direction perpendicular to an optical axis of the second reflector, a focal length of the at least one partial reflection surface of the second reflector is inversely proportional to a distance between a center of an opening of an optical cell of the second array and an edge of the opening thereof along a corresponding radial direction, and wherein the light that is emitted from each of the first and second light sources and is reflected by the respective reflector, is incident upon the optical integrator.

11. A light source apparatus that is applicable to an illuminating optical apparatus in which there is provided an optical integrator having a first array with a plurality of optical cells and a second array with a plurality of optical cells, the light source apparatus comprising:

a light source for emitting light; and a reflector for reflecting light emitted from the light source towards the optical integrator, wherein the reflector includes at least one partial reflection surface, the partial reflection surface having a shape selected from the group consisting of a portion of a revolution paraboloid and a portion of a spheroid, the light source being provided at a focal point of the reflector, and wherein, along each radial direction perpendicular to an optical axis of the reflector, a focal length of the at least one partial reflection surface is inversely proportional to a distance between a center of an opening of an optical cell of the second array and an edge of the opening thereof along a corresponding radial direction.

* * * * *